R. LINDNER.
SHAFT COUPLING.
APPLICATION FILED JAN. 10, 1910.
983,070.
Patented Jan. 31, 1911.
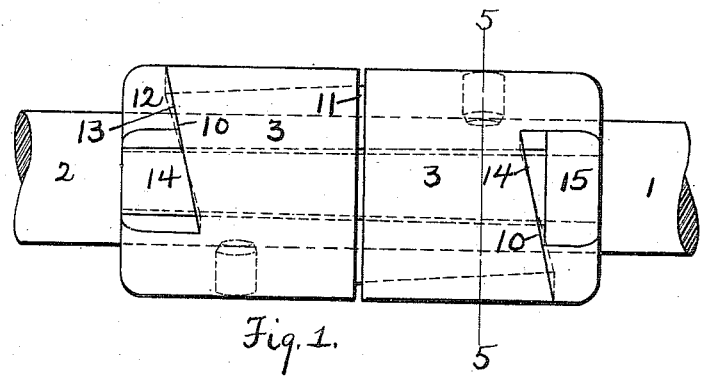
Fig. 1.
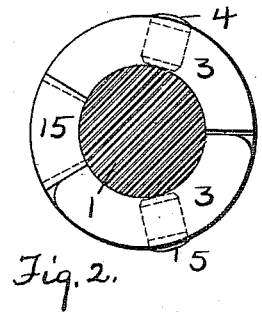
Fig. 2.
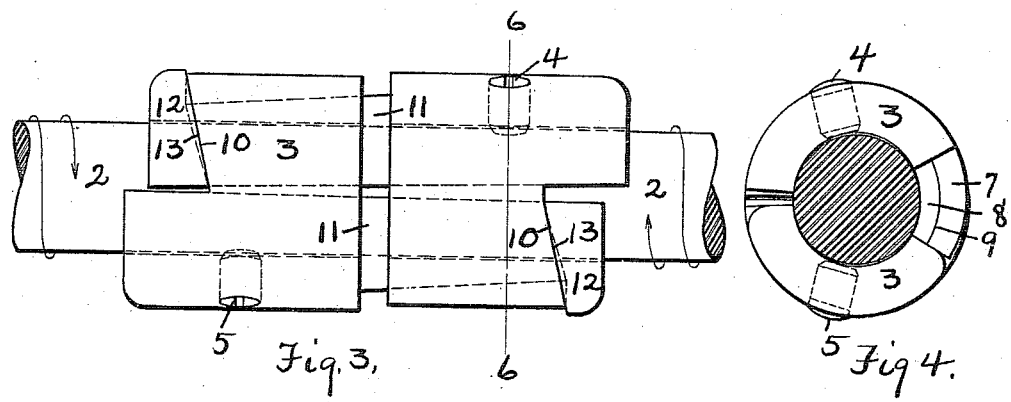
Fig. 3.
Fig. 4.
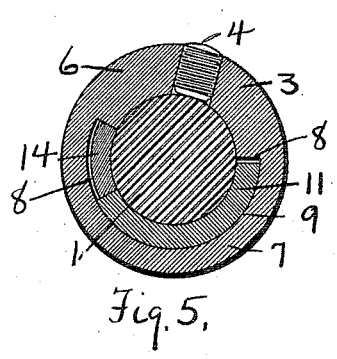
Fig. 5.
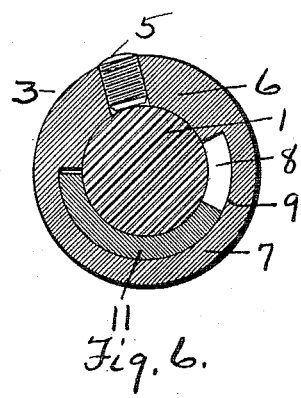
Fig. 6.
WITNESSES:
J. A. Cassidy
W. W. Eismann
INVENTOR.
Rudolf Lindner
BY H. C. Lord
ATTORNEY.

UNITED STATES PATENT OFFICE.

RUDOLF LINDNER, OF ERIE, PENNSYLVANIA.

SHAFT-COUPLING.

983,070.  Specification of Letters Patent.  Patented Jan. 31, 1911.

Application filed January 10, 1910. Serial No. 537,142.

*To all whom it may concern:*

Be it known that I, RUDOLF LINDNER, a subject of the Emperor of Austria-Hungary, residing at Erie, in the county of Erie and State of Pennsylvania, have invented new and useful Improvements in Shaft-Couplings, of which the following is a specification.

This invention relates to shaft couplings and consists in certain improvements in the construction thereof as will be hereinafter fully described and set forth in the claims.

The invention is illustrated in the accompanying drawings as follows:

Figure 1 is a side elevation of the coupling set and in place on two shafts; Fig. 2 is an end view of the same; Fig. 3 is a side elevation of the coupling on two shafts but not set; Fig. 4 is an end view of the parts as shown in Fig. 3; Fig. 5 is a section in the line 5—5 in Fig. 1; and Fig. 6 is a section on the line 6—6 in Fig. 3.

1 marks the driving shaft and 2 the driven shaft. This designation is simply for convenience of description as either may be the driving shaft.

The coupling is made up of two sleeves, 3 preferably exactly alike. A screw 4 is provided for initially locking one sleeve on the driving shaft and the screw 5 for initially locking the other sleeve on the driven shaft.

Each sleeve has a part 6 of its inner surface of the same diameter as the shaft, and a part 7 somewhat larger than the shaft leaving a space 8 between the shaft and part 7. The inner surface 9 of the part 7 is tapered axially as clearly shown by dotted lines in Figs. 1 and 3. The outer end of the part 7 is in the shape of a cam 10.

Each sleeve has a projection 11 extending through the other sleeve of the coupling and occupying the space 8. The inner surface of the projection is of the same diameter as the shaft and is an extension of the inner surface of the part 6. The outer surface of the projection is tapered to conform approximately to the inner surface of the part 7. Each projection has a shoulder 12 at its outer end with a cam face 13 adapted to operate in conjunction with the cam 10.

The operation of the coupling is as follows: The sleeves are assembled as shown in Fig. 3. The sleeves being separated axially as far as possible the smaller end of the tapered surface of the projection is interposed between the sleeve and shaft. The sleeves are initially locked with the shafts by the screws 4 and 5. As the drive shaft is rotated in the direction of the arrow the sleeve on the drive shaft is carried with it while the sleeve on the driven shaft remains relatively stationary. The consequence is that the sleeves are rotated relatively to each other, that is, the sleeve 3, locked with the driving shaft, rotates relatively to the sleeve 3 on the driven shaft. Cams 10 and 13 on the sleeve locked with the driving shaft are moved along the cams 13 and 10 respectively on the sleeve locked with the driven shaft. This forces the sleeves toward each other, or toward the position shown in Fig. 1. The tapering surfaces on the inner side of the sleeves are therefore forced on to the tapered surfaces of the parts 11 or, in other words, the parts 11 are forced as wedges into the sleeves, thus wedging the sleeves on the shafts. This wedging action securely locks the sleeves with the shafts and the projections communicate the movement from one sleeve to the other and consequently from one shaft to the other.

After the coupling is fully set it may be locked so as to prevent its release when the direction of movement of the driving shaft is reversed, by driving in the key 14 between the edges of the projection and the end of the space 8.

I prefer to provide the key with a shoulder 15 conforming in shape to the end of the sleeve.

What I claim as new is—

1. In a shaft coupling, the combination of two sleeves adapted to be mounted on a driving and driven shaft one of said sleeves having a projection extending within the other of the sleeves with a taper joint to decrease the opening through the sleeve as the projection and sleeve are moved relatively in an axial direction and means on said sleeves for moving them in an axial direction when they are rotated relatively to each other.

2. In a shaft coupling, the combination of two sleeves adapted to be mounted on a driving and driven shaft one of said sleeves having a projection extending within the other of the sleeves with a taper joint to decrease the opening through the sleeve as the projection and sleeve are moved relatively in an axial direction and means on said sleeves for moving them in an axial direction toward each other when they are rotated.

3. In a shaft coupling, the combination of two sleeves adapted to be mounted on a driving and a driven shaft, one of said sleeves having a projection extending within the other of the sleeves with a taper joint to decrease the opening through the sleeve as the projection and sleeve are moved axially relatively to each other, said projection having a shoulder at its outer end engaging the outer surface of the sleeve, said outer surfaces and shoulder being cam-shaped and acting as cams for moving the sleeve and projection axially relatively to each other to tighten the sleeve as the sleeves are rotated relatively to each other.

4. In a shaft coupling the combination of two sleeves adapted to be mounted on a driving and driven shaft, one of said sleeves having a projection extending within the other sleeve, the sleeve receiving the projection having a circumferential part of its inner surface of a bore to fit the shaft and a part of a size larger than a bore to fit the shaft to receive the projection, said projection and sleeve forming a tapered joint adapted to reduce the opening through the sleeve as they are moved relatively axially.

5. In a shaft coupling the combination of two sleeves adapted to be mounted on a driving and driven shaft, one of said sleeves having a projection extending within the other sleeve, the sleeve receiving the projection having a circumferential part of its inner surface of a bore to fit the shaft and a part of a size larger than a bore to fit the shaft to reecive the projection said projection and sleeve forming a tapered joint adapted to reduce the opening through the sleeve as they are moved relatively axially, and means on the sleeves for moving them relatively axially as they are relatively rotated.

6. In a shaft coupling the combination of two sleeves adapted to be mounted on a driving and driven shaft, one of said sleeves having a projection extending within the other sleeve, the sleeve receiving the projection having a circumferential part of its inner surface of a bore to fit the shaft and a part of a size larger than a bore to fit the shaft to receive the projection said projection and sleeve forming a tapered joint adapted to reduce the opening through the sleeve as they are moved relatively axially, means on the sleeves for moving them relatively axially as they are relatively rotated, and a key between the edges of the projection and circumferential end of the enlarged bore of the sleeve.

7. In a shaft coupling, the combination of two sleeves adapted to be mounted on a driving and driven shaft each of said sleeves having a projection extending within the other sleeve with a taper joint adapted to decrease the opening through the sleeve as the sleeves are moved axially relatively to each other.

8. In a shaft coupling the combination of two sleeves adapted to be mounted on a driving and driven shaft, each of said sleeves having a projection extending within the other sleeve with a taper joint adapted to decrease the opening through the sleeve as the sleeves are moved axially relatively to each other, and means on the sleeves for moving them axially as the sleeves are rotated relatively to each other.

9. In a shaft coupling the combination of two sleeves adapted to be mounted on a driving and driven shaft, each of said sleeves having a projection extending within the other sleeve with a taper joint adapted to decrease the opening through the sleeve as the sleeves are moved axially relatively to each other; and cams carried by the sleeves and operating as the sleeves are rotated relatively to each other to move the sleeves axially to set them on the shafts.

10. In a shaft coupling, the combination of two sleeves adapted to be mounted on a driving and a driven shaft each of said sleeves having a projection extending within the other sleeve, and each sleeve having a circumferential part of its inner surface of a bore to fit the shaft and a part of a size larger than a bore to fit the shaft to receive the projection, said projections and enlarged part of the sleeves forming tapered joints adapted to reduce the openings through the sleeves as the sleeves are moved relatively axially.

11. In a shaft coupling the combination of two sleeves adapted to be mounted on a driving and a driven shaft each of said sleeves having a projection extending within the other sleeve and each sleeve having a circumferential part of its inner surface of a bore to fit the shaft and a part of a size larger than a bore to fit the shaft to receive the projection, said projection and enlarged part of the sleeves forming tapered joints adapted to reduce the openings through the sleeves as the sleeves are moved relatively axially, and means on the sleeves for moving them relatively axially when they are rotated relatively to each other.

12. In a shaft coupling the combination of two sleeves adapted to be mounted on a driving and a driven shaft each of said sleeves having a projection extending within the other sleeve and each sleeve having a circumferential part of its inner surface of a bore to fit the shaft and a part of a size larger than a bore to fit the shaft to receive the projection, said projection and enlarged part of the sleeves forming tapered joints adapted to reduce the openings through the sleeves as the sleeves are moved relatively axially; means on the sleeves for moving them relatively axially when they are rotated relatively to each other; and a key between the edges of the projections and the circumferential ends of the enlargements in the sleeves.

13. In a shaft coupling, the combination of two sleeves adapted to be mounted on a driving and driven shaft each of said sleeves having a projection extending within the other sleeve, and each sleeve having a circumferential part of its inner surface of a bore to fit the shaft and a part of a size larger than a bore to fit the shaft to receive the projection, said projection and enlarged part of the sleeves forming tapered joints adapted to reduce the openings through the sleeves as the sleeves are moved relatively axially, said projections having shoulders at their outer ends engaging the outer ends of the sleeves the outer ends of the sleeves and shoulders forming cams between them for moving said sleeves and projections relatively to each other as the sleeves are relatively rotated to set the coupling.

14. In a shaft coupling, the combination of two sleeves adapted to be mounted on a driving and driven shaft one of said sleeves having a projection extending within the other of the sleeves with a taper joint to decrease the opening through the sleeve as the projection and a sleeve are moved relatively in an axial direction and means on said sleeves for moving them in an axial direction toward each other when they are rotated; and means for initially locking said sleeves to a driving or driven shaft whereby the initial movement of the driving shaft will set the coupling.

In testimony whereof, I have hereunto set my hand in the presence of two subscribing witnesses.

RUDOLF LINDNER.

Witnesses:
MILES B. KITTS,
H. C. LORD.